United States Patent [19]
Wagenknecht et al.

[11] 3,907,652
[45] Sept. 23, 1975

[54] ELECTROOXIDATION OF PHOSPHONOMETHYL AMINES

[75] Inventors: John H. Wagenknecht, Kirkwood; Kurt Moedritzer, Webster Groves, both of Mo.

[73] Assignee: Monsanto Company, St. Louis, Mo.

[22] Filed: Oct. 30, 1974

[21] Appl. No.: 519,316

[52] U.S. Cl. .................. 204/79; 204/78; 260/502.5
[51] Int. Cl.² ........................................... C25B 3/02
[58] Field of Search ........ 204/79, 78, 72; 260/502.5

[56] References Cited
UNITED STATES PATENTS
3,137,705   6/1964   Prelog et al.......................... 204/79

Primary Examiner—R. L. Andrews
Attorney, Agent, or Firm—Joseph D. Kennedy

[57] ABSTRACT

Phosphonomethylamines are oxidized by electrolysis at the anode to remove a phosphonomethyl group. The process can prepare secondary amines from tertiary amines. The products are useful as antiprecipitants, sequestering agents and the like.

11 Claims, No Drawings

ELECTROOXIDATION OF PHOSPHONOMETHYL AMINES

The present invention relates to the electrochemical removal of phosphonomethyl groups from amine nitrogen. The invention involves the electrochemical oxidation of amines containing an

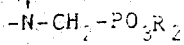

function, in which the R's are individually selected from hydrogen, or salt or ester forming groups. The reaction results in removal of the phosphonomethyl group and its replacement by a hydrogen substituent on the amino nitrogen. The reaction can be employed to convert tertiary amines to secondary amines or secondary amines to primary amines. The reaction can also be used to convert primary amines to ammonia, although such a procedure may have little practical value, unless for degradation of undesired components in a system, or because of desired concomitant products of the oxidation. The reaction can, of course, also be utilized to convert tertiary amines to secondary amines and then to primary amines, or even to ammonia.

The reaction can be illustrated:

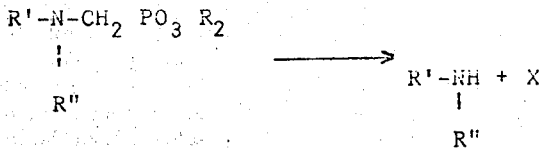

where
R' and R'' are individually selected from hydrogen or organo substituents, or together form part of a ring compound, and
R is individually selected from hydrogen or salt or ester forming groups.

The reaction thus produces an amine corresponding to the starting phosphonomethyl amine, but from which a phosphonomethyl group has been removed. The other product, designated as X, in most cases appears to be a formyl phosphonic acid or derivative.

In the above illustrated reaction either or both of R' and R'' can and often are phosphonomethyl groups, or monovalent hydrocarbyl groups, or such groups with imino, amino, phosphonomethyl imino, or phosphonomethyl amino substituents. R' and R'' can also be hydrogen.

In the illustrated reaction, it will often be desireable to employ tertiary phosphonomethylamines, as such tertiary amines may be the reagents available for modification and which may be desired in the form of secondary amines. At times secondary amines are difficult to prepare by usual procedures without contamination by primary and tertiary amines. Also, the oxidation of the tertiary amines in general requires less elevated oxidation potentials than do the secondary or primary amines, and the reaction is therefore less apt to involve side reactions from other reactive groups if such are present in the amine compound.

The phosphonomethyl amines which are electrolytically oxidized in the present process can and often do contain more than one phosphonomethyl group, as exemplified for example by the reaction of nitrilotrimethylenetriphosphonic acid:

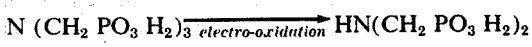

In previously employed procedures, generally an amine, formaldehyde, and orthophosphoric acid react to form the fully substituted amine, and attempts to prepare secondary amines by this reaction generally lead to a mixture that is very difficult to separate. This has resulted in use of a modified, multi-step process to prepare amines such as iminodimethylenediphosphonic acid. The present invention provides the second step of a two-step synthesis of, for example, iminodimethylenediphosphonic acid starting from ammonia, formaldehyde and orthophosphorous acid.

The phosphonomethyl compounds used as reactants herein can have the phosphono moiety in the phosphonic acid form, or in the form of various derivatives thereof such as salts and esters. Thus in the $-CH_2 PO_3 R_2$ moiety the R groups can, for example, individually be hydrogen, alkali metal, alkaline earth metal, ammonium and organoammonium, monovalent hydrocarbon radicals containing 1 to 12 carbon atoms, halogenated monovalent hydrocarbon radicals, hydrocarbon oxyhydrocarbon groups containing 1 to 4 carbon atoms interconnecting the hydrocarbon moieties.

Illustrative of the monovalent hydrocarbon radicals represented by R are alkyl groups of the formula $C_aH_{2a+1}$, such as methyl, ethylpropyl, butylhexyl, octyl, decyl, dodecyl and their isomers, etc; alkenyl groups of the formula $C_aH_2{}^{a-1}$, such as ethenyl, propenyl, butenyl, octenyl, dodecenyl and their isomers, etc; aryl groups containing 6 through 10 carbon atoms such as phenyl, tolyl, xylyl, ethylphenyl, diethylphenyl and the like; aralkyl groups such as benzyl, phenylethyl, phenylpropyl, dimethylphenylpropyl, dimethylphenylbutyl and the like; and the halogenated derivatives thereof containing up to three halogen atoms.

By the term halogen as employed herein is meant fluorine, chlorine, bromine and iodine.

The term "alkali metal" encompasses lithium, sodium, potassium, cesium and rubidium; and the term "alkaline earth metal" includes beryllium, magnesium, calcium, strontium and barium.

The phosphonomethyl moiety in any of the illustrative reactions herein can have R groups in accordance with the foregoing disclosure. The phosphonomethyl group containing compounds will in general be employed in the same way in the reaction, aside from the type of phosphonic acid derivative employed, except for the ester or other derivative groups having some effect upon solubility of the reactant in the electrolysis medium. In general high solubility is not necessary for the electrolysis, but some solvents particularly suited to organic soluble esters will be illustrated herein. The isolation procedures may also vary with the particular derivative and the form in which it is to be isolated.

The present invention may be most useful in the modification of amino phosphonate compounds known to be useful and used as sequestering agents for metal ions or used as threshold agents to inhibit precipitation and scale formation.

A particular type of compound for which the present invention will be useful in removing phosphonemethyl groups is represented by the formula:

and the reaction results in the removal of at least one phosphonomethyl group, represented by A, to produce

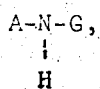

with possibly additional changes in the G moiety, depending upon whether it contains additional phosphonomethyl groups subject to removal. In the above formula, A represents a phosphonomethyl group, $-CH_2-PO_3R_2$ in which R has the same meaning as hereinbefore, and G is selected from A, alkyl, especially lower alkyl, aralkyl, cycloalkyl, and $[-(CH_2)_n-(B)_m-]_P(CH_2)_n-N(A)_2$ in which B is

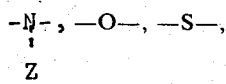

where

Z is A, lower alkyl, aralkyl, or cycloalkyl, and
$m$ is zero or 1,
$n$ is an integer from 1 to 12, preferably from 1 to 6,
P is an integer from 1 to about 2000 or more.

It will be apparent that the above formula includes, for example, such variations in the reactant as illustrated by the following:

$N(A)_3$
$(A)_2$ N-alkyl
$(A)_2N-(CH_2)_n-N(A_2)$
$(A)_2 N-[(CH_2)_n-(B)_m-]_P(CH_2)_n-N(A)_2$

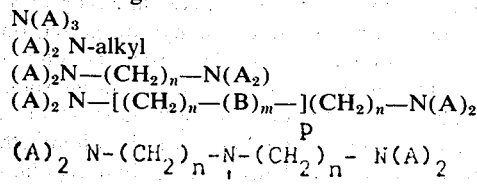

in which the symbols have the same meaning as described above, and all of these types of compounds can be utilized in the present process. The alkylene linkages in these reactants are ordinarily saturated, or at least ordinarily contain no non-aromatic unsaturation, but there is no fundamental reason why olefinic or other unsaturated groups should not be present, except certain olefinic structures may cleave rather than A. Various other types of groups can also be present, but if such groups are readily oxidized, the resulting product may be modified by the oxidation of that group, as well as by removal of the phosphonomethyl group, and the significance of this will depend upon the particular reactant and the desired product. The methyl group of the phosphonomethyl group ordinarily bears no substituent other than the phosphono group, but can have non-interfering substituents, such as in amino tri(ethylidenephosphonic acid) and other phosphonomethyl amines in which the methyl group has a lower alkyl substituent and one free hydrogen. The phosphonomethyl groups can, for example, appropriately be attached to polyethyleneimine resins as reactants.

Phosphonomethylamines of the type utilized as reactants herein are known agents for various water treating and similar purposes, particularly as scale inhibiting agents as described in U.S. Pat. No. 3,336,221, and as metal ion sequestering agents as described in U.S. Pat. No. 3,234,124, and the compounds described in these patents can in general be employed in the present process. In addition, the compounds resulting from the present process will in general be suitable for the same purposes, although possibly in greater or lesser degree, especially when the resulting compound still includes one or more of the phosphonomethyl groups. In addition to scale inhibition in boiler waters etc., such agents are effective in inhibiting corrosion of iron, steel and other metal coming into contact with such water under highly oxygenated or otherwise possibly corrosive conditions. Because of their inhibiting, anti-precipitant, chelating and sequestering properties, such agents are usefully employed in various soaps, detergents and cleaning compounds, and the products of the present process can be employed in the same applications. In addition some of the products of the present process are known compounds of known utility in such applications. A number of the reactants utilized in the present process are sold under the Dequest trademark for scale inhibition, sequestering metal ions, etc. The products of the present process may have advantages in greater or easier biodegradability.

In accordance with the present process an N-phosphonomethyl amine is charged into an electrolytic cell fitted with a cathode and an anode, and an electromotive force is impressed upon the cell whereby the compound is electrolytically oxidized to yield an amine in which a phosphonomethyl group has been replaced by a hydrogen atom. The electrolysis can be carried out in various media as fundamentally all htat is necessary is to have a conductive liquid medium which permits the oxidation to occur at the anode. Ordinarily aqueous solutions of the reactant are convenient for use, and will be employed. Acidification is an aid to solubility, and in some cases is also useful in aiding selectivity of the reaction.

In an exemplary method of conducting the present process, a 2 percent to 30 percent solution of the phosphonomethylamine dissolved in 1.0 percent to 37 percent hydrochloric acid (1–37% HCl in water), usually 10–25 percent or possibly up to 35 to 37 percent, HCl, is charged into an electrolytic cell maintained at a temperature of from 25° C to 110° C and having noble metal, graphite or carbon electrodes. Other acids can be employed in the same or similar concentration ranges. An electric current is then impressed on the cell by connecting the anode and cathode to a proper source of direct current with controls to maintain the current density at between 1 and 1000ma/cm² for a time sufficient to oxidize the phosphonomethylamine compound to the corresponding amine, for example, a phosphonomethyl tertiary amine to a secondary amine.

The resultant reaction solution is then vacuum evaporated to remove the aqueous hydrochloric acid reaction medium and volatile by-products. The residue is then dissolved in water and recoved by recrystallization upon the cooling of the water solution, possibly with addition of alcohols or other materials to aid crystallization.

The concentrations of the phosphonomethylamine compound employed in the process of this invention is not critical and limited only by the solubility of the starting material in water. Thus, for example, although concentrations as low as 0.01 percent by weight in water can be employed, for reasons of efficiency and economy, it is preferred to employ concentrations of from about 5 to about 30 percent by weight, or even higher, of the reactant in an aqueous electrolyte.

The temperature at which the process of the instant invention is conducted is not narrowly critical and can range from as low as 0°C. to as high as 110°C. or even higher if a pressure cell is employed. As is apparent to those skilled in the art, at lower temperatures a very dilute solution or a suspension must be employed since the solubility of the starting material is lower at lower temperatures.

The process of the instant invention can be conducted at atmospheric pressure, super atmospheric pressures and subatmospheric pressures. For reasons of economy and ease of construction of the equipment employed in the process of this invention, it is preferred to conduct this process at approximately atmospheric pressure.

The type of electrolytic cell employed in the process of this invention is not critical. The cell can consist of a glass container having one or more anodes and cathodes connected to a source of direct current, such as a battery and the like or a source of low frequency alternating current. The cell can also consist of the two electrodes separated by an insulator such as a rubber or other non-conducting gasket. If desired, a porous or semipermeable divider can be employed to separate anode and cathode compartments, such as glass frit or ion exchange membrane, but such a divider is not generally necessary or even desirable.

The current densities employed in the process of this invention can range from as low as 1 milliampere per square centimeter ($ma/cm^2$) to 1 ampere or more per square centimeter.

The electrodes, i.e., the anode and cathode, employed in the process of this invention can be constructed of a wide variety of materials and combinations of materials. Thus, for example, the anodes may be constructed of any conductive substance, such as lead, graphite, lead oxide, carbon in various forms, platinum, various metal oxides such as manganese dioxide, copper oxide, nickel oxide and the like, and can be in many different forms such as gauze, solids, porous, etc.

The cathodes can also be of any conductive substance such as copper, lead, platinum, palladium, lead oxide, graphite, carbon and the like. It is preferred to employ a noble metal such as palladium or platinum or various forms of graphite, carbon or glassy carbon as the electrode materials employed in the process of this invention. Other electrode materials are less preferred since they corrode rapidly and their ions contaminate the electrolyte, thereby rendering the isolation of the product expensive and difficult.

The acids which can be employed to render the aqueous medium acidic include the hydrohalic acids such as hydrochloric, hydroiodic, hydrobromic and hydrofluoric and other inorganic acids such as sulfuric, nitric, phosphoric, perchloric, tetrafluoroboric, trifluoroacetic and other strong organic acids such as toluene sulfonic acid, etc. and hexafluorophosphonic, etc.

For ease of removal, economy and convenience, it is preferred to employ aqueous hydrochloric acid as the aqueous medium in the process of this invention. The other acids can cause more difficult removal, corrosion and the like. However, at times other acids may be appropriate for desired selectivity to secondary or primary amines as product.

The bases which can be employed to render the aqueous medium basic include the alkali and alkaline earth metal oxides and hydroxides such as, for example, sodium, potassium, rubidium, cesium, calcium and barium, oxides and hydroxides, and organic bases such as tetraalkyl ammonium hydroxides, tertiary amines and the like.

It is, of course, apparent to those skilled in the art that the aqueous medium must be a conducting aqueous medium to obtain the best flow of current. Thus, the acids or bases or salts of such acids and bases can be employed to make the electrolytic solution conductive.

It is, of course, apparent to those skilled in the art that the time of reaction is variable and is determined by variables such as current density, electrode area, concentration and volume of the reaction solution.

The product can also be recovered and purified by crystallization from a mixture of isopropanol and water, or other appropriate mixtures of solvents and non-solvents.

In the present process the reactant will usually be a tertiary amine, and the reaction will be conducted to remove only one phosphonomethyl group so that a secondary amine is obtained, as the secondary amine will usually be the desired product. In the event that the tertiary amine has more than one N-phosphonomethyl substituent, the reaction conditions can be regulated to provide selective oxidation to produce the secondary amine. In general, the tertiary amine requires the lowest oxidation voltage, then the secondary amine, and the primary amine requires the highest voltage. Thus a potentiostat can be employed to regulate the anode voltage at that sufficient for the oxidation of the phosphonomethyl group from the tertiary amine but below that for oxidation of the phsophonomethyl group from a secondary amine. The same result can often be obtained by regulating the applied voltage to obtain a resulting current and anode potential, depending upon the electrolysis mixture, such that the potential causes only the desired oxidation. The proper anode potentials to employ can be determined with reasonable accuracy by cyclic voltametry of the phosphonomthylamines. However, if desired, the oxidation can be conducted by simply subjecting the electrolysis mixture containing the phosphonomethylamine to an applied potential until a suitable current is caused to flow through the mixture, and thereafter separating and identifying the resulting product. Another convenient way of regulating the potential is by choice of the reaction medium. Thus hydrochloric acid happens to have an oxidation potential (for oxygen and/or chlorine evolution) which is somewhat higher than the usual phosphonomethyl group on a tertiary amine, but not as high as that of such groups as secondary amines, and use of hydrochloric acid provides a convenient way of stopping the reaction at the secondary amine product. If desired, appropriate conditions can be selected to have oxidation to the primary amine. Often electrolysis under conditions permitting high anode potentials, and use of extended reaction times will be sufficient. However, if desired the cyclic voltametry potentials of the particular tertiary, secondary and primary amines will provide a guide for selection of conditions, employing anode potential sufficient for oxidation of secondary amine but not of primary. Such conditions can be employed with the secondary amine, whether present as the original reactant or produced by electro-oxidation of tertiary amine.

There are generally advantages in using aqueous systems for the electrolysis, and only a very limited solubility in such systems is needed, as for example, electrolysis can be carried out in a practical manner with concentrations of the amine reactant as low as 2 percent. The phosphonic acid groups contribute to solubility if in the acid or salt form, and one phosphonomethyl acid group in salt form will generally confer sufficient solubility, even if the other acid hydrogen of the phosphonomethyl group is replaced by an esterifying radical, annd other phosphonomethyl groups are completely esterified. However, if all of the phosphonomethyl groups are completely esterified, solvents other than water can be employed to improve solubility. Illustrative of such solvents are nitriles such as acetonitrile, propionitrile, benzonitrile, etc.; nitro compounds such as nitromethane, nitroethane, etc; halogenated hydrocarbons such as methylene chloride, ethylene chloride, etc.; and cyclic ethers such as tetrahydrofuran, and the ethers such as ethylene glycol dimethyl ether, diethylene glycol dimethyl ether and mixtures of the above solvents with each other and with aliphatic alcohols, etc.

The enabling electrolytes which can be employed to render non-aqueous solvent medium conducting include the metal perchlorates, fluoroborates, acetates, hexafluoro phosphate and the like. The only limitation on the enabling electrolyte being employed is that it dissolves in the solvent, that it ionizes in the solvent and that it is not oxidized at the potential of the oxidation of the amine in the specific solvent being employed. Specific examples of such enabling electrolytes are salt such as ammonium hexafluoro phosphate, ammonium fluoroborate and the alkali or alkaline earth metal salts such as sodium, potassium or rubidium hexafluoro phosphate, sodium fluoroborate, trimethylammonium hexafluoro phosphate, sodium fluoroborate, trimethylammonium hexafluorophosphate, tetramethylammonium toluenesulfonate, tetraethylammonium toluenesulfonate dimethylammonium fluoroborate, diethylammonium perchlorate, tetrapropyl ammonium perchlorate, lithium perchlorate, tetraethylammonium acetate and the like. Of course strong acids will not ordinarily be employed with esters unless some hydrolysis of the esters is desired or acceptable.

The following table lists a number of amines which have been electro-oxidized in accord with the present invention, and the amine products obtained.

lic voltametry. The voltametry was run with a glassy carbon electrode, from zero to +2 volts vs. the saturated calomel electrode at 25 seconds/volt and 700 microampere span. With a 50% sulfuric acid solution there was a background oxidation peak at 1.5 volts. Nitrolotrimethylenetriphosphonic acid had a peak (Ep) at 1.22 volts, and iminodimethylenediphosphonic acid did not oxidize. With 0.1 molar nitric acid solution, nitrilotrimethylenetriphosphonic acid had a peak at 0.96 volts, and iminodimethylenediphosphonic acid at 1.4 volts.

The oxidation potentials were determined on the following employing 0.1 molar nitric acid solution, but a 1.4 milliampere span:

| Compound | Ep (volts) |
|---|---|
| $N(CH_2PO_3H_2)_3$ | 0.96 |
| $HO_2C(CH_2)_5N(CH_2PO_3H_2)_2$ | 0.93, 1.09 |
| $CH_3N(CH_2PO_3H_2)_2$ | 1.02 |
| $[(H_2O_3PCH_2)_2NCH_2CH_2]_2 N—CH_2PO_3H_2$ | 0.86, 1.04 |

Oxidation potentials were determined on a number of amines at neutral pH. The solvent was concentrated phosphonic acid which was diluted 15 to 1 with water and neutralized with sodium hydroxide. The cyclic voltametry scan was 0.1 volt/sec., employing a glassy carbon electrode.

| Compound | Potential |
|---|---|
| $N(CH_2PO_3H_2)_3$ | Wave at 0.5 volt; 0.85 volt |
| $[(H_2O_3PCH_2)_2NCH_2]_2$ | Wave at 0.5 volt; 0.85 volt |
| $[(H_2O_3PCH_2)_2NCH_2CH_2CH_2]_2$ | Wave at 0.55 volt, 0.77 volt, and 1.2 volt |
| $CH_3(CH_2)_{11}N(CH_2PO_3H_2)_2$ | Peak at 0.5 volt Hump at 0.8 volt |
| $HN(CH_2PO_3H_2)_2$ | broad wave at 1.2 volt |

The oxidation potentials of a number of amines were determined by cyclic voltametry of 5–5.5 millimolar concentrations of the amines in 0.15 molar phosphonic acid, with a scan of 0.04 volt/second and 700 microam-

TABLE I

| Starting Amine | Products |
|---|---|
| $N(CH_2PO_3H_2)_3$ | $HN(CH_2PO_3H_2)_2$ |
| $CH_3N(CH_2PO_3H_2)_2$ | $CH_3NHCH_2PO_3H_2$ |
| $[(H_2O_3PCH_2)_2NCH_2]_2$ | $HN(CH_2PO_3H_2)_2 + (H_2O_3PCH_2NHCH_2$ |
| $[(H_2O_3PCH_2)_2NCH_2CH_2CH_2]_2$ | $(H_2O_3PCH_2NHCH_2CH_2CH_2)_2$ |
| $HO_2C(CH_2)_5N(CH_2PO_3H_2)_2$ | $HO_2C(CH_2)_5NHCH_2PO_3H_2$ |
| $HO_2C(CH_2)_4N(CH_2PO_3H_2)_2$ | $HO_2C(CH_2)_4NHCH_2PO_3H_2$ |
| $HO_2C(CH_2)_3N(CH_2PO_3H_2)_2$ | $HO_2C(CH_2)_3NHCH_2PO_3H_2$ |
| $CH_3(CH_2)_{11}N(CH_2PO_3H_2)_2$ | $CH_3(CH_2)_{11}NHCH_2PO_3H_2$ |
| $[(H_2O_3PCH_2)_2N—CH_2CH_2]_2NCH_2PO_3H_2$ | $(H_2O_3PCH_2NHCH_2)_2$ |
| $[(H_2O_3PCH_2)_2NCH_2CH_2]_2O$ | $(H_2O_3PCH_2NHCH_2CH_2—)_2O$ |
| $[(H_2O_3PCH_2)_2NCH_2CH_2]_2S$ | $(H_2O_3PCH_2NHCH_2CH_2—)_2S$ |
| $C_6H_5CH_2CH_2N(CH_2PO_3H_2)_2$ | $C_6H_5CH_2CH_2NHCH_2PO_3H_2$ |
| $C_6H_5CH_2N(CH_2PO_3H_2)_2$ | 60% $C_6H_5CH_2NHCH_2PO_3H_2$ / 40% $HN(CH_2PO_3H_2)_2$ |
| $HOCH_2CH_2N(CH_2PO_3H_2)_2$ | $HOCH_2CH_2NHCH_2PO_3 H_2$ |
| $HO_2C(CH_2)_{11}N(CH_2PO_3H_2)_2$ | $HO_2C(CH_2)_{11}NHCH_2PO_3H_2$ |
| $(H_2O_3PCH_2)_2N(CH_2)_8N(CH_2PO_3H_2)_2$ | $H_2O_3PCH_2NH(CH_2)_8NHCH_2PO_3H_2$ |
| $(H_2O_3PCH_2)_2NCH_2-\langle S \rangle-CH_2N(CH_2PO_3H_2)_2$ | $H_2O_3PCH_2NHCH_2-\langle S \rangle-CH_2NHCH_2PO_3H$ |
| $(H_2O_3PCH_2)_2N(CH_2)_3N(CH_2PO_3H_2)_2$ | $H_2O_3PCH_2NH(CH_2)_3NHCH_2PO_3H_2$ |

The following shows the oxidation potentials of indicated phosphonomethyl amines as determined by cyclic voltametry. The oxidation voltages, vs. saturated calomel electrode were as follows:

| Compound | Ep |
|---|---|
| $HOCH_2CH_2N(CH_2PO_3H)_2$ | 1.29 |
| $HO_2C(CH_2)_3N(CH_2)PO_3H_2)_2$ | 1.03 |
| $CH_3N-CH_2PO_3H_2$<br>$\quad\mid$<br>$\quad CH_2CO_2H$ | 1.26 |
| $HO_2CCH_2N(CH_2PO_3H)_2$ | 1.14 |
| $N(CH_2PO_3H_2)_3$ | 1.00 |
| $C_6H_5CH_2CH_2N(CH_2PO_3H_2)_2$ | 1.03 and 1.31 |
| $HN(CH_2PO_3H_2)_2$ | 1.4 |
| $[(H_2O_3PCH_2)_2NCH_2CH_2CH_2]_2NCH_3$ | 0.86 and 1.04 |
| $C_6H_5CH_2N(CH_2PO_3H_2)_2$ | 1.01 |
| $HO_2C(CH_2)_3N(CH_2PO_3H_2)_2$ | 1.06 |
| $CH_3N(CH_2PO_3H_2)_2$ | 1.25 |

The following examples serve to further illustrate the invention.

EXAMPLE 1

For this procedure nitrilotrimethylenetriphosphonic acid was oxidized at an anode to iminodimethylenediphosphonic acid. A 10 gram amount of nitrilotrimethylenetriphosphonic acid was dissolved in 80 ml. 20 percent hydrochloric acid with warming on a steam bath. The undivided cell used was a split beaker with a graphite anode (30 cm$^2$) and platinum wire cathode, and a magnetic stirring bar. The solution was electrolyzed at 250 milliampere (8 milliampere/cm$^2$) for 12 hours. Low boiling materials were removed under vacuum to leave an oil, which was then treated with isopropanol and a little water. The oil was permitted to crystallize and then heated over a steam bath, cooled in ice water, filtered, washed with an isopropanolwater solution, and dried under vacuum to provide 5.4 grams product identified as iminodimethylenediphosphonic acid. Anal. calc'd: C, 11.70; H, 4.42; N, 6.83; P, 30.21. Found C, 11.52; H, 4.34; N, 6.57; P, 29.30. Correcting for the amount of material taken for analytical samples, the 10 grams of starting reactant would produce a theoretical yield of 6.85 grams, so the actual yield was 82 percent of theory. A two electron oxidation would require 0.0668 Faraday, or 1.79 ampere-hour. The 3 ampere-hours used represents a 60% current efficiency. The product compound was identical to an authentic sample of iminodimethylenediphosphonic acid. As the starting phosphonic acid reactant, nitrilotrimethylenetriphosphonic acid, available under trademark designation Dequest 2001, was employed.

EXAMPLE 2

An electrolysis was conducted in a split beaker cell with graphite anode and platinum wire cathode, and potential controlled by a potentiostat. An 80 ml. solution of 0.1 N $HNO_3$ carried little current at 1.0 volt vs saturated calomel electrode, but about 100 milliamperes at 1.4 volts. A 10 gram amount of nitrilotrimethylenetriphosphonic acid was added, causing a rapid increase in current. The potential was reduced to 0.95 volt, where 1 ampere was produced, and then gradually increased until the current was 1.4 amperes. After 12 hours total electrolysis, the current dropped to 120 milliamperes and the electrolysis was stopped. The electrolysis mixture was then vacuum evaporated, and the residue was treated with isopropanol, but the residual oil would not crystallize. The material was vacuum evaporated, treated with water, and vacuum evaporated again. Analysis of the mixture by nuclear magnetic resonance spectral analysis indicated a mixture of starting material, iminodimethylenediphosphonic acid, and N-phosphonomethylamine. Thus the reaction produced some secondary amine, and some of the secondary amine was oxidized to a primary amine. The products are useful as sequestering agents for metal ions.

EXAMPLE 3

Into an electrolysis cell as described in Example 2, 40 ml. of aqueous $CH_3N(CH_2PO_3H_2)_2$ solution (about 20 percent by weight) was placed with 40 ml. of concentrated hydrochloric acid. Electrolysis was conducted at 250 milliamperes (7 milliamperes/cm$^2$) for 26 hours. Low boiling materials were removed, and isopropanol was added, but crystallization did not occur. After successive evacuation, water treatment, and evacuation, the residue was treated with ethanol, and heated on a steam bath to produce crystallization. A 3.76 gram product was separated by filtration which was identified by nuclear magnetic resonance as N-methyl-N-phosphonomethylamine. ($CH_3NHCH_2PO_3H_2$), melting point 274°–275°C. The compound is useful as a threshold anti-precipetant scale inhibitor and sequestering agent.

EXAMPLE 4

A 40 gram amount of nitrilotrimethylenetriphosphonic acid was dissolved in 200 ml. 20% hydrochloric acid on a steam bath. This was electrolyzed in a flowing system with 8.5 cm$^2$ porous disc graphite anode and platinum foil cathode. The flow was 100 ml. minute, with a current of 1 ampere and temperature of about 70°C. After 4 hours about 57 percent conversion to the secondary amine had been obtained, and the current was lowered to 0.6 ampere and the electrolysis was continued for five more hours. Nuclear magnetic resonance of the electrolysis mixture showed complete conversion of the reactant. The mixture was evaporated to a solid, boiled with isopropanol, refrigerated overnight, filtered and dried to 25 grams of product, for a 91 percent yield of the iminodimethylenediphosphonic acid.

EXAMPLE 5

A 75 ml. solution of about 20 percent by weight of N-methyliminodi(methylenephosphonic acid) in water and 75 ml. concentrated hydrochloric acid was electrolyzed in the cell of Example 4 under the same conditions and flow rate to obtain complete conversion, as shown by nuclear magnetic resonance, in 6 hours. The product was isolated in the same way except employing ethanol rather than isopropanol to obtain 6.4 grams of solid product, which was recrystallized from ethanol-water to yield 4.5 grams. This compares to a theoretical yield of 8.4 grams of the methylaminomethylenephosphonic acid.

In a flow through cell, as employed in Example 5, and in general suitable for use in the present invention, a porous graphite electrode is placed in a glass tube and the electrolysis mixture is pumped through the electrode to contact it and then through the tube containing the other electrode, and out of the tube and back through the pump to have a circulating system. In the system the porous electrode is generally the anode, and the other electrode is the cathode, and accordingly appropriately electrically converted. It may be appropriate to employ a carbon rod of graphite or other material as the cathode.

EXAMPLE 6

A 48 percent by weight solution of [($H_2O_3PCH_2$)$_2$N—$CH_2CH_2$]$_2$N$CH_2PO_3H_2$ in water and 50 ml. 20% hydrochloric acid was mixed and electrolyzed in a flow cell with an 8.5 cm² porous graphite anode with 1 ampere current, 100 ml/minute flow rate, and at 70°C. The electrolysis was continued for 8 hours. Liquid was evaporated, water added, and evaporated to leave a dark oil. Water was added to fluidity, then ethanol to cause an oily precipitate which partially crystallized upon standing. The mass was dissolved in water, treated with charcoal, filtered, and recrystallized from ethanol-water to give white crystalline material which decomposed around 140°–150°C. A 7.5 gram amount of material was obtained. The material which had been formed as a second crop of crystals was combined with crystalline material obtained from another run under substantially the same conditions, treated with water and heated on the steam bath for 3 hours. The insoluable material was filtered off and dried overnight under vacuum to give 4.13 grams of white, amorphous solid, decomposing at 295°–300°C. Anal. calc'd for $C_4H_{18}N_2O_8Phd\ 2$: C, 16.9; H, 6.38; N, 9.86; P, 21.8. Found: C, 16.86; H, 6.10; N, 9.79; P, 21.56. The product, ethylenediamindi-(methylenephosphonic acid), ($H_2O_3PCH_2NHCH_2$—)$_2$. $2H_2O$ has sequestering and other surfactant and detergent builder type properties similar to the phosphonic acid compound from which it was prepared, and other Dequest brand phosphonic acid compounds.

EXAMPLE 7

A 15 gram amount of hexamethylenediaminetetra-(methylenephosphonic acid) in 100 ml. concentrated hydrochloric acid was electrolyzed in a flow cell with porous graphite anode and flow rate of 100 ml. per minute. The electrolysis was conducted at 1 ampere for 2 hours and 1.5 ampere for 2 hours. Liquid was stripped off under vacuum, water was added and stripped off, ethanol added, and 7.2 gram solid obtained by filtration. The material was recrystallized from water, giving a white solid, decomposing at about 300°C. The material, identified as hexamethylenediamine di(methylenephosphonic acid) had analysis as follows: Calc'd for $C_8H_{26}N_2O_8P_2$ dihydrate: C, 28.23; H, 7.70; N, 8.23; P, 18.21. Found: C, 27.68; H, 7.36; N, 8.18; P, 18.20.

EXAMPLE 8

A 15 gram amount of dodecylaminodi(methylenephosphonic acid) was electrolyzed in accord with the procedure of Example 7 for 1 hour at 1 ampere. Analysis of the reaction mixture by nuclear magnetic resonance indicated reaction was incomplete. Water was added, and 10 grams of waxy solid was obtained by filtration. The ethanol insoluble material was treated by successive ethanol extractions, including several days in a Soxhlet extractor. The material was identified as dodecylaminophosphonic acid.

EXAMPLE 9

A 2.82 gram amount of [($H_2O_3PCH_2$)$_2$N$CH_2CH_2$]$_2$S in 50 ml. concentrated hydrochloric acid was electrolyzed in a flow cell with porous graphite anode and carbon cathode for 2 hours at 1 ampere. The product was isolated by successive evacuations and treatments with water, isopropanol and acetone to obtain 1 gram of solid material which was further treated with acetone-water and freeze dried to give material identified as di(-phosphonomethylaminoethyl) sulfide, which contained some water and phosphoric acid.

EXAMPLE 10

A 4.56 gram amount of 4-carboxybutyliminodi(methylenephosphonic acid) in 40 ml. hydrochloric acid was electrolyzed in a small flow through cell with graphite anode for 2 hours. The product was isolated by successive evacuations and water additions and crystallization from acetone-water to obtain 1.27 grams solid identified as 4-carboxybutylaminomethylenephosphonic acid m.p. 207–209. Analysis for $C_6H_{14}NO_5P\cdot\frac{1}{2} H_2O$: C, 32.74; H, 6.87; N, 6.37; P, 14.07. Found: C, 32.64; H, 6.71; N, 6.45; P, 14.67.

EXAMPLE 11

A 1.79 gram amount of di(diphosphonomethyliminoethyl) ether in 15 ml. of concentrated hydrochloric acid was electrolyzed in a sandwich cell at 70°C and 200 milliampere for 2.5 hours. The cell had a 4.8 millimeter gap between the electrodes. The product was isolated from acetone-water as tan crystals, decomposing at 277°–279°C, and identified as di(phosphonomethyliminoethyl) ether.

What is claimed is:

1. The process of removing a phosphonomethyl group from an N-phosphonomethylamine which comprises subjecting an electrolysis medium containing such N-phosphonomethylamine to an electromotive force whereby the N-phosphonomethylamine is oxidized and an N-phosphonomethyl group thereof is removed.

2. The process of claim 1 in which a tertiary N-phosphonomethylamine group is oxidized.

3. The process of claim 2 in which the tertiary amine group is oxidized to a secondary amine group.

4. The process of claim 1 which involves electrolysis in an aqueous acidic medium in contact with an anode at a potential sufficient to cause oxidation.

5. The process of claim 4 in which the concentration of the N-phosphonomethylamine is about 5 to 30 percent by weight of the electrolysis medium and the acid concentration is about 10 to 37 percent by weight.

6. The process of claim 5 in which the acid is hydrochloric acid and a tertiary amine group is converted to a secondary amine group.

7. The process of claim 1 in which the N-phosphonomethylamine is of the formula:

in which A is a phosphonomethyl group and G is selected from A, alkyl, aralkyl, cycloalkyl and

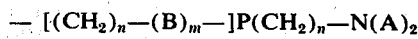

in which B is

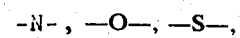

wherein Z is A, lower alkyl, aralkyl, or cycloalkyl, and $m$ is zero or 1, $n$ is an integer from 1 to 12 and $p$ is an integer from 1 to 2000.

8. The process of claim in which an N,N,N-triphosphonomethylamine is converted to an N,N-diphosphonomethylamine.

9. The process of claim 1 in which an alkyl N,N-diphosphonometheylaminee is converted to an alkyl N-phosphonomethylamine.

10. The process of claim 1 in which an alkylene bis-(iminodimethylenediphosphonic acid) is converted to an alkylene-bis(iminomethylenephosphonic acid).

11. The process of claim 1 in which nitrilotrimethylene-triphosphonic acid is converted to iminodimethylenediphosphonic acid.

* * * * *